(12) United States Patent
Liu

(10) Patent No.: US 12,621,551 B2
(45) Date of Patent: May 5, 2026

(54) VARIABLE APERTURE, CAMERA MODULE, AND ELECTRONIC DEVICE

(71) Applicant: BEIJING XIAOMI MOBILE SOFTWARE CO., LTD., Beijing (CN)

(72) Inventor: Xinjie Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 125 days.

(21) Appl. No.: 18/373,937

(22) Filed: Sep. 27, 2023

(65) Prior Publication Data

US 2025/0008207 A1 Jan. 2, 2025

(30) Foreign Application Priority Data

Jun. 27, 2023 (CN) .......................... 202310765603.X

(51) Int. Cl.
*H04N 23/55* (2023.01)
*G03B 17/02* (2021.01)

(52) U.S. Cl.
CPC ............. *H04N 23/55* (2023.01); *G03B 17/02* (2013.01)

(58) Field of Classification Search
CPC ...... H04N 23/55; H04N 5/2353; G03B 17/02; G03B 2205/0007; G03B 2205/0046; G03B 30/00; G03B 9/06; G03B 9/08–54; G02B 5/005
See application file for complete search history.

(56) References Cited

U.S. PATENT DOCUMENTS

| | | | | | |
|---|---|---|---|---|---|
| 8,908,088 | B2 * | 12/2014 | Ishimasa | ................ | H04N 25/61 |
| | | | | | 348/363 |
| 10,969,653 | B2 * | 4/2021 | Kim | ......................... | G03B 9/06 |
| 2018/0164537 | A1 * | 6/2018 | Lee | ......................... | H04N 23/55 |
| 2020/0077000 | A1 | 3/2020 | Lee et al. | | |

(Continued)

FOREIGN PATENT DOCUMENTS

| | | |
|---|---|---|
| CN | 110460764 A | 11/2019 |
| CN | 110780507 A | 2/2020 |

(Continued)

OTHER PUBLICATIONS

Extended European Search Report issued in Application No. 23207370.0 dated Apr. 23, 2024, (7p).

(Continued)

*Primary Examiner* — Abdelaaziz Tissire
(74) *Attorney, Agent, or Firm* — Arch & Lake LLP; Hao Tan; Shen Wang

(57) ABSTRACT

The present disclosure provides a variable aperture, camera module, and electronic device, belonging to the field of electronic technology. The variable aperture includes: a first base member, a driving member, and at least one shading blade; The first base member includes an aperture hole, at least one shading blade is rotatably connected to the first base member, and the driving member is movably connected to at least one shading blade; The variable aperture is configured so that when the driving member moves relative to the first base member, the driving member drives at least one shading blade to rotate relative to the first base member, causing at least a portion of the shading blade to enter or exit the aperture hole, changing the effective light entrance area of the aperture hole.

15 Claims, 10 Drawing Sheets

(56) References Cited

U.S. PATENT DOCUMENTS

| | | | |
|---|---|---|---|
| 2020/0401014 A1* | 12/2020 | Seo | ........................... G03B 9/06 |
| 2020/0409235 A1 | 12/2020 | Zhou et al. | |
| 2023/0384652 A1* | 11/2023 | Chen | ...................... G03B 17/02 |

FOREIGN PATENT DOCUMENTS

| | | | |
|---|---|---|---|
| CN | 111948872 | A | 11/2020 |
| CN | 112513731 | A | 3/2021 |
| EP | 3503526 | B1 | 7/2020 |
| JP | 2012058762 | A | 3/2012 |

OTHER PUBLICATIONS

First Office Action of CN Application No. 202310765603.X dated Nov. 19, 2025 with English translation, (31p).

* cited by examiner

VARIABLE APERTURE, CAMERA MODULE, AND ELECTRONIC DEVICE

CROSS-REFERENCE TO RELATED APPLICATION

The present application is based upon and claims the benefit of priority to Chinese Patent Application No. 202310765603X, filed on Jun. 27, 2023, the entire contents of which are incorporated herein by reference for all purposes.

BACKGROUND

Currently, electronic devices such as mobile phones, tablets, and personal computers (PCs) require constant shooting quality under various brightness conditions. To achieve this goal, a variable aperture (VA) can be set on the light entrance side of the optical lens within the camera module. The size of the aperture hole of the variable aperture is variable. In high brightness environments, the size of the aperture hole can be reduced to allow a relatively small amount of light to enter the optical lens. In low brightness environments, the size of the aperture hole can be enlarged to allow a relatively large amount of light to enter the optical lens. Therefore, the adjustment of the light input of the optical lens is realized, and the shooting quality is guaranteed.

SUMMARY

The present disclosure relates to the field of electronic technology, in particular, to a variable aperture, a camera module, and an electronic device. In order to overcome the problems existing in the related technologies, the present disclosure provides a variable aperture, a camera module, and an electronic device.

According to a first aspect of the present disclosure, there is provided a variable aperture, including: a first base member, a driving member, and at least one shading blade;
the first base member includes an aperture hole, the at least one shading blade is rotatably connected to the first base member, and the driving member is movably connected to the at least one shading blade;
the variable aperture is configured that, in response to that the driving member moves relative to the first base member, the driving member drives the at least one shading blade to rotate relative to the first base member, so that at least a portion of the at least one shading blade enters or exits the aperture hole, changing an effective light entrance area of the aperture hole.

According to a second aspect of the present disclosure, there is provided a camera module, including:
an optical lens;
a photosensitive component including a circuit board and a photosensitive element, where the photosensitive element is electrically connected to the circuit board, and the optical lens is located on a photosensitive path of the photosensitive element; and
the variable aperture according to the present disclosure, where the variable aperture is located on a light entrance path of the optical lens.

According to a third aspect of the present disclosure, there is provided an electronic device, including the variable aperture in the first aspect or any embodiment of the first aspect described above, or the camera module in the second aspect of any embodiment of the second aspect described above.

It is to be understood that both the foregoing general description and the following detailed description are exemplary and explanatory only and are not restrictive of the present disclosure.

BRIEF DESCRIPTION OF THE DRAWINGS

The accompany drawings, which are incorporated in and constitute a part of the description, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
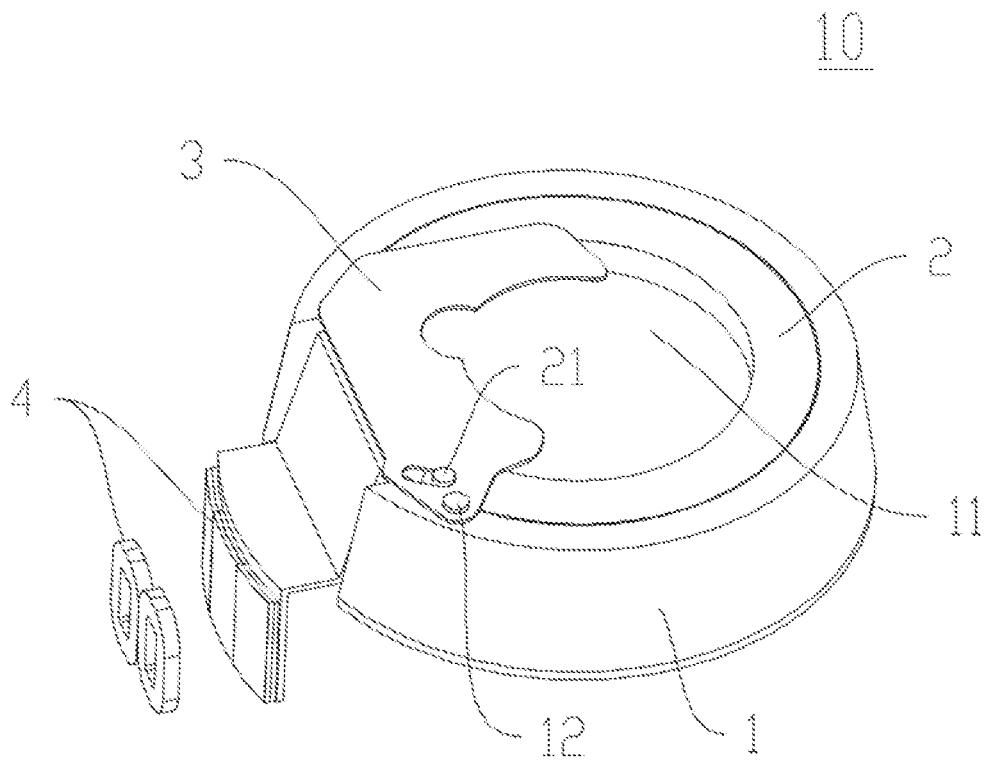
FIG. 1 is a schematic diagram of a structure of a variable aperture according to an embodiment of the present disclosure.

In the description of the present disclosure, it should be understood that the orientations or positional relationships indicated by the terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential direction" are based on the orientations or positional relationships shown in FIG. 1, and are only for the convenience of describing the present disclosure and simplifying the description, rather than indicating or implying that the apparatus or element referred to must have a specific orientation, be constructed and operated in a specific orientation, and therefore cannot be understood as a limitation of the present disclosure.

It should be understood that in the present disclosure, "electrical connection" can be understood as physical contact and electrical conduction of components; it can also be understood as a form of connecting different components in the circuit construction through a physical circuit such as a printed circuit board (PCB), a copper foil, or a wire that can transmit electrical signals. "Communication connection" can refer to the transmission of electrical signals, including wireless communication connections and wired communication connections. The wireless communication connections do not require physical media and do not belong to connection relationships that limit product construction. Both "connection" and "link" can refer to a mechanical or physical connection relationship, that is, A connecting to B or A linking to B can refer to the presence of a fixed component, such as a screw, a bolt, a rivet, etc. between A and B, or A and B are in contact with each other and A and B are difficult to be separated.

Unless otherwise defined, all technical terms used in the embodiments of the present disclosure have the same meanings as those commonly understood by the person skilled in the art.

Optical Image Stabilization (OIS): it relies on the structure and motion of special lenses or photosensitive elements to minimize image instability caused by jitter during use by the operator.

Auto Focus (AF): it makes the reflected light to be received by a sensor on the camera (module) using the principle of object light reflection, and drives an electric focusing device for focusing by processing of a computer.

The variable aperture is an aperture device that can be adjusted as needed to control the amount of light entering the camera. The variable aperture is widely used in the field of professional cameras, and the size of this type of variable aperture is controlled by a set of blades inside the lens, and can be manually or automatically adjusted. A larger aperture allows more light to enter the camera, making the photo brighter, and at the same time, it can produce an effect of shallow depth of field when shooting a subject at a close range, which highlights the subject. A smaller aperture can restrict light from entering the camera, making the photo darker, and at the same time, it can produce an effect of deep depth of field when shooting distant scenery, making the entire picture clearer.

The lens and volume of a professional camera are relatively large, and there is a sufficient space in the professional camera to arrange complex mechanical structures for variable aperture blade control. However, due to the volume of electronic devices such as mobile phones, the volumes of mobile phone cameras and their lenses are strictly controlled, making it difficult to achieve the variable aperture of mobile phone cameras.

In the related art, the mobile phone cameras of mid to low-end electronic devices usually have a fixed aperture size, so they cannot achieve the function of variable aperture. Only some high-end electronic devices may be provided with lenses with variable aperture, because the variable aperture of the mobile phone camera generally has complex structures and high costs.

Therefore, the present disclosure provides a variable aperture, as well as a camera module and electronic device applying the variable aperture. The structure of the shading blade and the driving member is simple, and the aperture adjustment is achieved by rotation, without the need for complex mechanical structures. The volume is small, which is conducive to the application of the variable aperture in the miniaturized and microminiaturized camera modules.

The electronic device provided in the present disclosure can be any of various types of computer system devices that are mobile or portable and perform wireless communication (only one form is shown by example in FIG. 1). Specifically, the electronic device can be a mobile phone or a smartphone (such as iPhone™ or Android™ based phones), a portable gaming device (such as Nintendo DS™, PlayStation Portable™, Gameboy Advance™, iPhone™), a laptop, a PDA, a portable internet device, a music player, and a data storage device, as well as other handheld devices such as headphones. The electronic device can also be other wearable devices that require charging, such as an electronic bracelet, a necklace, a head-mounted device (HMD) of an electronic device or a smart watch.

The electronic device can also be any one of a plurality of electronic devices, including but not limited to a cellular phone, a smartphone, other wireless communication devices, a personal digital assistant, an audio player, other media players, a music recorder, a video recorder, other media recorders, a radio, a medical device, a vehicle transportation instrument, a calculator, a programmable remote control, a pager, a laptop, a desktop computer, a printer, a netbook, a personal digital assistant (PDA), a portable multimedia player (PMP), a motion picture expert group (MPEG-1 or MPEGG-2) audio layer 3 (MP3) player, a portable medical device, and a digital camera and their combinations.

In some cases, the electronic device can perform a plurality of functions (such as playing music, displaying videos, storing images, and receiving and sending phone calls). If needed, the electronic device can be such as a cellular phone, a media player, other handheld devices, a watch device, a pendant device, an earphone, or other compact portable devices.

In order to make the purpose, technical solution, and advantages of the present disclosure clearer, the implementations of the present disclosure will be further described in detail in conjunction with the accompanying drawings.

Figure 2:
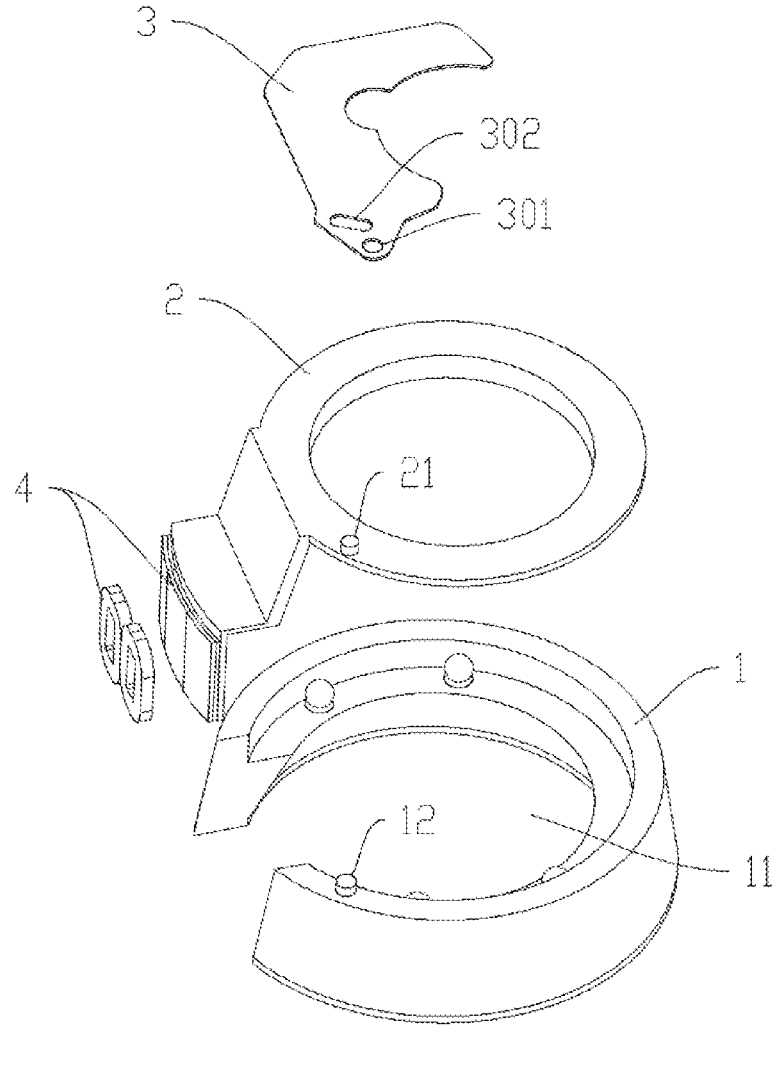
FIG. 2 is an exploded view of the structure of the variable aperture according to an embodiment of the present disclosure.

On the one hand, as shown in FIGS. 1 and 2, this embodiment provides a variable aperture 10, which includes: a first base member 1, a driving member 2, and at least one shading blade 3; the base member is provided with an aperture hole 11, at least one shading blade 3 is rotatably connected to the base member, and the driving member 2 is movably connected to at least one shading blade 3.

The variable aperture 10 is configured to: the driving member 2 drives at least one shading blade 3 to rotate relative to the base member when the driving member 2 moves relative to the base member, causing at least a portion of the at least one shading blade 3 to enter or exit the aperture hole 11, thereby changing the effective light entrance area of the aperture hole 11. The effective light entrance area refers to an area of the aperture hole 11 that is not obstructed by the shading blade 3. When the area of this part of the aperture hole 11 is large, more light enters the aperture hole 11, and when the area of this part of the aperture hole 11 is small, less light enters the aperture hole 11, thus achieving adjustment of the aperture.

In the variable aperture 10 of this embodiment, the shading blade 3 is rotatably connected to the base member, and the driving member 2 drives the shading blade 3 to rotate relative to the base member, causing at least a portion of the shading blade 3 to rotate into or out of the aperture hole 11, changing the effective light entrance area of the aperture hole 11, thereby achieving the adjustment of the aperture size. The structure of the shading blade 3 and the driving member 2 is simple, and the aperture adjustment is achieved through rotation, without the need for complex mechanical structures. The volume is small, which facilitates the application of the variable aperture 10 in miniaturized and microminiaturized camera modules.

At least one shading blade 3 of this embodiment is rotatably connected to the base member, and the rotational connection has better impact resistance compared to other movable connection manners (such as sliding) and can improve the working reliability of the variable aperture 10.

For example, the number of shading blades 3 is one, two, three, and so on. Optionally, the number of shading blades 3 is two.

As another example, the driving member 2 is rotatably connected to the base member, and the driving member 2 can rotate relative to the base member. When the driving member 2 rotates relative to the base member, the driving member 2 drives the shading blade 3 to rotate relative to the base member. As a result, the connection relationships between the driving member 2 and the shading blade 3 and the base member are rotational connection, both of which have good impact resistance and can improve the working reliability of the variable aperture 10.

In some possible implementations, the shading blade 3 is located on the light inlet side of the aperture hole 11. The shading blade 3 is made of lightweight non-transparent material. When at least a portion of the shading blade 3 enters the aperture hole 11, the portion of the aperture hole 11 blocked by the shading blade 3 will not receive light.

As shown in FIGS. 1 and 2, in some embodiments, at least one shading blade 3 is provided with a blade hinge part 301 and a blade guide part 302; an aperture hinge part 12 is provided on the base member on a circumference of the aperture hole 11, and the driving member 2 is provided with an aperture guide part 21; the blade hinge part 301 is rotatably connected to the aperture hinge part 12, and the blade guide part 302 is movably connected to the aperture guide part 21.

The shading blade 3 achieves the rotational connection between the shading blade 3 and the base member by utilizing the hinge connection between the blade hinge part 301 and the aperture hinge part 12. The aperture hinge part 12 is located on the circumference of the aperture hole 11, i.e., a position close to the aperture hole 11. The shading blade 3 is hinged at a position close to the aperture hole 11, and the effective working area of the shading blade 3 (that is, the area that can rotate into the aperture hole 11) is relatively large, only a small area needs to be reserved as the hinge part, and the rest can be used as the effective working area. The effective working area of a single shading blade 3 is large, which is beneficial for reducing the number of shading blades 3 used, and the weight of the entire variable aperture 10 is light. By utilizing the movable connection between the blade guide part 302 and the aperture guide part 21, the power of the shading blade 3 is achieved, and the driving structure of the shading blade 3 is simple and efficient.

Referring to FIGS. 1 and 2, in some embodiments, one of the blade hinge part 301 and the aperture hinge part 12 is a hinge hole, and the other one of the blade hinge part 301 and the aperture hinge part 12 is a hinge shaft. Illustratively, the blade hinge part 301 is a hinge hole, and the aperture hinge part 12 is a hinge shaft; alternatively, the blade hinge part 301 is a hinge shaft, and the aperture hinge part 12 is a hinge hole.

The rotation axis of the blade hinge part 301 and the aperture hinge part 12 is parallel to the axis of the aperture hole 11, so that at least one shading blade 3 rotates in a plane perpendicular to the axis of the aperture hole 11. Therefore, the shading blade 3 can rotate in a direction perpendicular to the axis of the aperture hole 11, enter or exit the aperture hole 11, and has more stable rotation characteristics.

Referring to FIGS. 1 and 2, in some embodiments, one of the blade guide part 302 and the aperture guide part 21 is a guide groove, while the other one of the blade guide part 302 and the aperture guide part 21 is a guide protrusion. For example, the blade guide part 302 is a guide groove, and the aperture guide part 21 is a guide protrusion; alternatively, the blade guide part 302 is a guide protrusion, and the aperture guide part 21 is a guide groove. With the cooperation of the guide groove and the guide protrusion, the power transmission between the driving member 2 and the shading blade 3 can be realized, so that the shading blade 3 can rotate relative to the base member.

Exemplarily, the guide groove includes but is not limited to a straight groove, a curved groove, and so on. The guide protrusion can be a raised structure, or a structure such as a pin shaft or pin.

Figure 3:
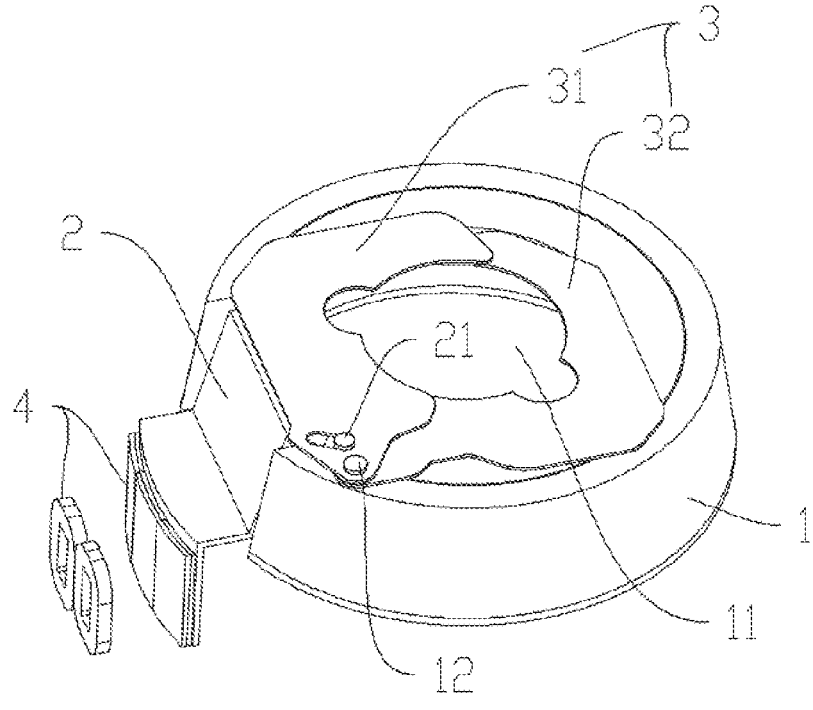
FIG. 3 is a schematic diagram of the structure of the variable aperture according to an embodiment of the present disclosure.
Figure 4:
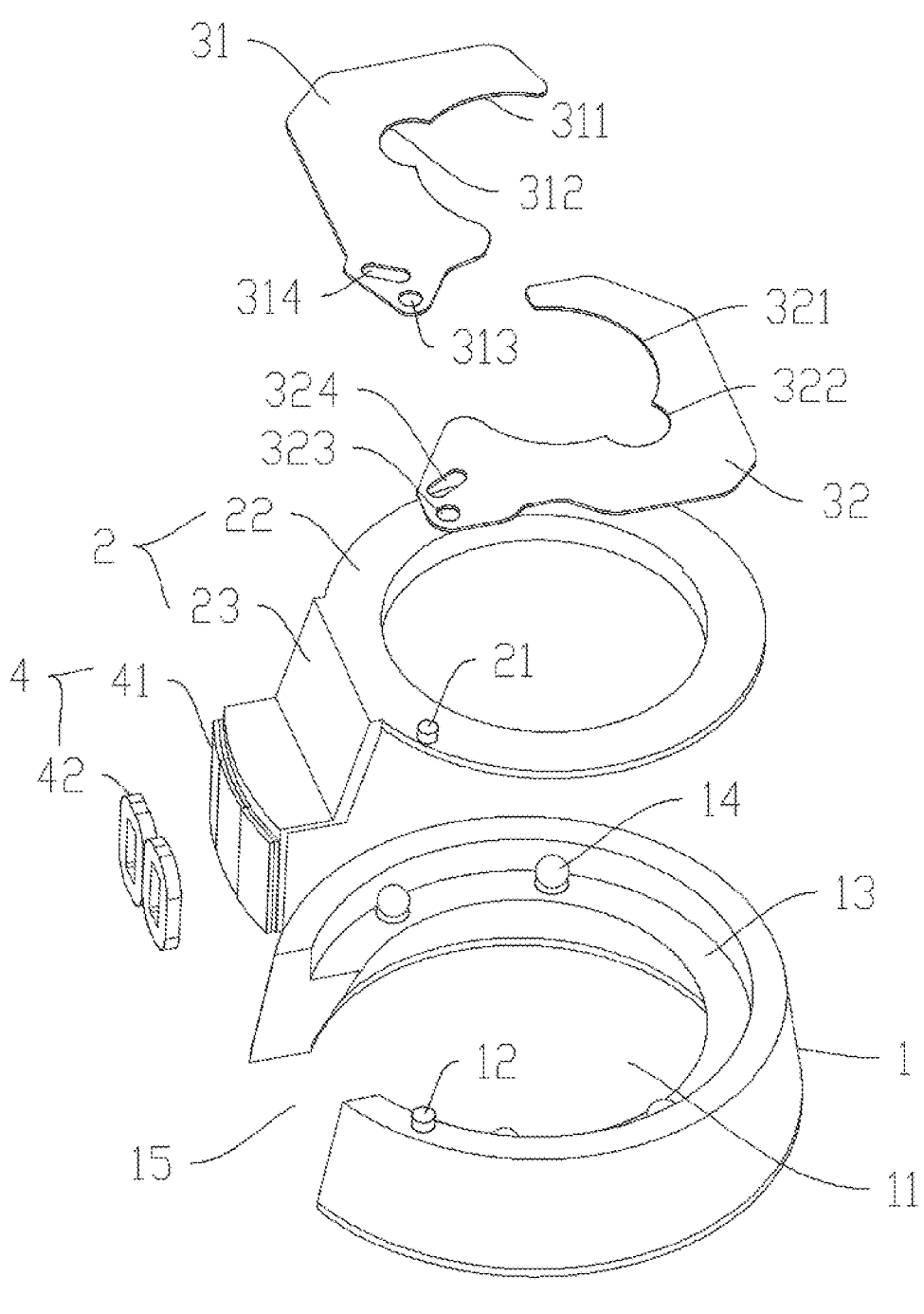
FIG. 4 is an exploded view of the structure of the variable aperture according to an embodiment of the present disclosure.

Referring to FIGS. 3 and 4, in some embodiments, the shading blade 3 includes a first shading blade 31 and a second shading blade 32; the first shading blade 31 and the second shading blade 32 are respectively rotatably connected to the base member, and the first shading blade 31 and the second shading blade 32 are located at different positions on the circumference of the aperture hole 11, respectively.

The first shading blade 31 and the second shading blade 32 are respectively movably connected to the driving member 2, and the driving member 2 can drive the first shading blade 31 and the second shading blade 32 to rotate relative to the base member, so that at least part of the first shading blade 31 and the second shading blade 32 synchronously enters or exits the aperture hole 11.

The variable aperture 10 of this embodiment includes a first shading blade 31 and a second shading blade 32. The two shading blades 3 are respectively movably connected to the driving member 2. When the driving member 2 moves, the two shading blades 3 can synchronously enter or exit the aperture hole 11. When the two shading blades 3 enter the aperture hole 11 synchronously, the effective light entrance area of the aperture hole 11 decreases, and the aperture decreases. When the two shading blades 3 exit the aperture hole 11 synchronously, the effective light entrance area of the aperture hole 11 increases, and the aperture increases.

Double blades can ensure the improvement of aperture adjustment efficiency and adjustment range under the premise of small weight. The structure of the variable aperture 10 is simple and the variable aperture 10 has a relatively small dimension, especially a relatively small dimension along the axial direction of the aperture hole 11. It is suitable for miniaturization and microminiaturization of mobile cameras and other application scenarios.

Figure 5:
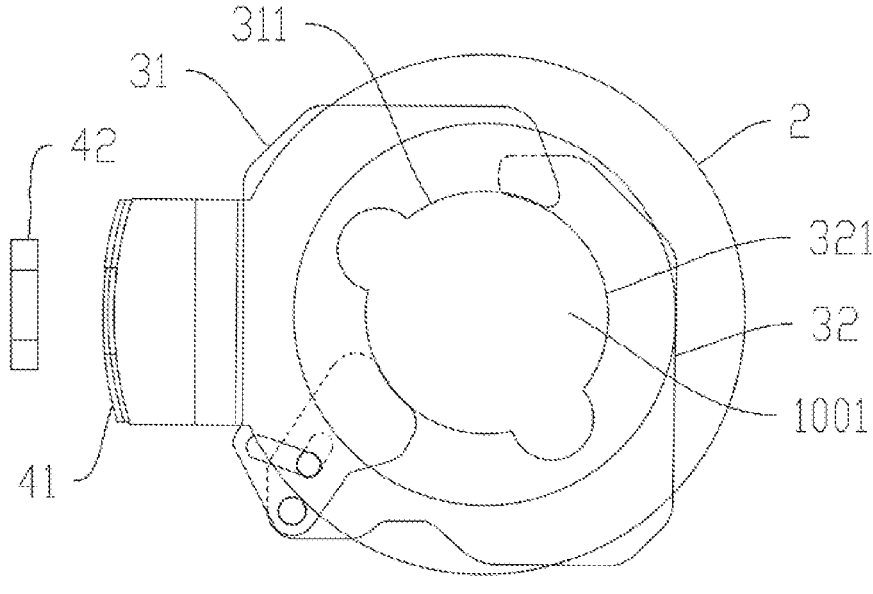
FIG. 5 is a structural schematic diagram of the variable aperture according to an embodiment of the present disclosure forming a first target aperture.

Referring to FIGS. 3, 4 and 5, in some embodiments, the first shading blade 31 is provided with a first concave part 311 on a side facing the axis of the aperture hole 11, and the second shading blade 32 is provided with a second concave part 321 on a side facing the axis of the aperture hole 11.

The positions of the first concave part 311 and the second concave part 321 are opposite. When the first shading blade 31 and the second shading blade 32 enter the aperture hole 11 synchronously, the first concave part 311 can be concatenated with the second concave part 321 with a recess facing a recess, and the space formed by the first concave part 311 and the second concave part 321 becomes the first target aperture 1001.

Due to the rotational motion of the first shading blade 31 and the second shading blade 32, in order to ensure that the first shading blade 31 and the second shading blade 32 can form a target aperture after entering the aperture hole 11, the first concave part 311 and the second concave part 321 are respectively arranged on the first shading blade 31 and the second shading blade 32, and when the first concave part 311 and the second concave part 321 are connected, they can enclose to form the first target aperture 1001, thereby achieving aperture adjustment.

In some possible implementations, the first concave part 311 and the second concave part 321 are circular concave parts, respectively. The motion trajectory lines of the center of the first concave part 311 and the center of the second concave part 321 precisely pass through the axis of the aperture hole 11, so that the axis of the first target aperture 1001 can coincide with the axis of the aperture hole 11.

Figure 6:
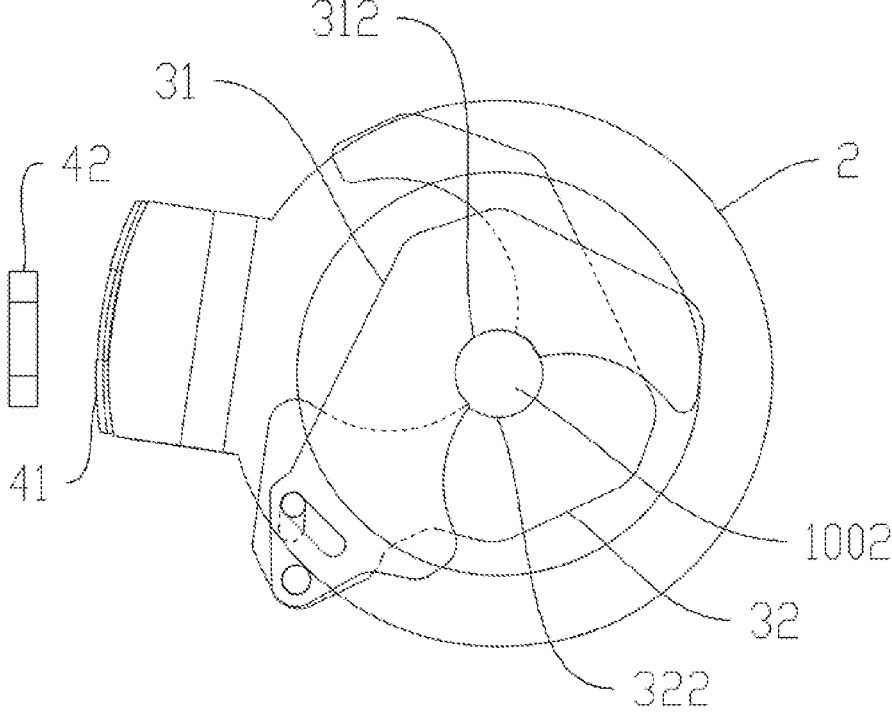
FIG. 6 is a structural schematic diagram of the variable aperture according to an embodiment of the present disclosure forming a second target aperture.

Referring to FIGS. 3, 4 and 6, in some embodiments, the first shading blade 31 on the inner side of the first concave part 311 is further provided with a third concave part 312, and the second shading blade 32 on the inner side of the second concave part 321 is further provided with a fourth concave part 322.

The positions of the third concave part 312 and the fourth concave part 322 are opposite. When the first shading blade 31 and the second shading blade 32 enter the aperture hole 11 synchronously, the third concave part 312 and the fourth concave part 322 can be connected with a recess facing a recess, and the space formed by the third concave part 312 and the fourth concave part 322 becomes the second target aperture 1002.

By arranging a third concave part 312 on the inner side of the first concave part 311 and a fourth concave part 322 on the inner side of the second concave part 321, it is possible to further rotate inward through the first shading blade 31 and the second shading blade 32 on the basis of the first target aperture 1001, and the third concave part 312 and the fourth concave part 322 encloses to form the second target aperture 1002 with a smaller aperture. The adjustment of the first target aperture 1001 and the second target aperture 1002 only requires controlling the rotation angle of the first shading blade 31 and the second shading blade 32 entering the aperture hole 11, which is simple to control and has high working reliability.

It should be noted that the present disclosure uses the first target aperture 1001 and the second target aperture 1002 as illustrative descriptions, and does not limit the variable aperture 10 of the present disclosure to only include the first target aperture 1001 and the second target aperture 1002.

The number of target apertures and the size of apertures can be adjusted by reasonably designing the number and size of concave parts, to generate a third target aperture, a fourth target aperture, and so on, which is not limited by the present disclosure.

In some possible implementations, the third concave part 312 and the fourth concave part 322 are circular concave parts, respectively. The motion trajectory lines of the center of the third concave part 312 and the center of the fourth concave part 322 precisely pass through the axis of the aperture hole 11, so that the axis of the second target aperture 1002 can coincide with the axis of the aperture hole 11.

In some embodiments, the axes of the first target aperture 1001, the second target aperture 1002, and the aperture hole 11 coincide. When the axes of the first target aperture 1001, the second target aperture 1002, and the aperture hole 11 coincide, regardless of whether the aperture is large or small, the light entering the aperture hole 11 can be concentrated around the axis of the aperture hole 11, which is conducive to improving the imaging quality and imaging efficiency of the photosensitive component in the camera module.

Referring to FIGS. 3 and 4, in some embodiments, the first shading blade 31 is provided with a first blade hinge part 313 and a first blade guide part 314, while the second shading blade 32 is provided with a second blade hinge part 323 and a second blade guide part 324.

The base member on a circumference of the aperture hole 11 is provided with an aperture hinge part 12, and the driving member 2 is provided with an aperture guide part 21; the first blade hinge part 313 and the second blade hinge part 323 are respectively rotatably connected to the aperture hinge part 12, and the first blade guide part 314 and the second blade guide part 324 are respectively movably connected to the aperture guide part 21; when the driving member 2 moves relative to the base member, the aperture guide part 21 can drive the first shading blade 31 and the second shading blade 32 to rotate in opposite directions around the aperture hinge part 12, respectively.

The variable aperture 10 of this embodiment adopts a double blade design. In order to further simplify the structure, the first shading blade 31 and the second shading blade 32 share one aperture hinge part 12 and one aperture guide part 21, and one driving member 2 is used to drive the first shading blade 31 and the second shading blade 32 to synchronously rotate in the opposite directions, so that the two shading blades 3 can enter or exit the aperture 11 synchronously.

Taking the aperture guide part 21 being a guide protrusion and the blade guide part 302 being a guide groove as an example, the rotation direction of the shading blade 3 is determined by the relative position of the aperture guide part 21 and the aperture hinge part 12, as well as the movement direction of the aperture guide part 21 and the extension direction of the blade guide part 302. Through reasonable design of the relative position of the aperture guide part 21 and the aperture hinge part 12, as well as the movement direction of the aperture guide part 21 and the extension direction of the blade guide part 302, the driving member 2 can drive the synchronous reverse rotations of the first shading blade 31 and the second shading blade 32.

In some possible implementations, the aperture guide part 21 is closer to the aperture hole 11 than the aperture hinge part 12, that is, the distance between the aperture hole 11 and the aperture guide part 21 is smaller than the distance between the aperture hole 11 and the aperture hinge part 12. The first blade guide part 314 and the second blade guide part 324 are both guide grooves and extend in opposite directions. Therefore, when the driving member 2 drives the aperture guide part 21 to move in a certain direction, the rotation directions of the first shading blade 31 and the second shading blade 32 are opposite.

Figure 7:
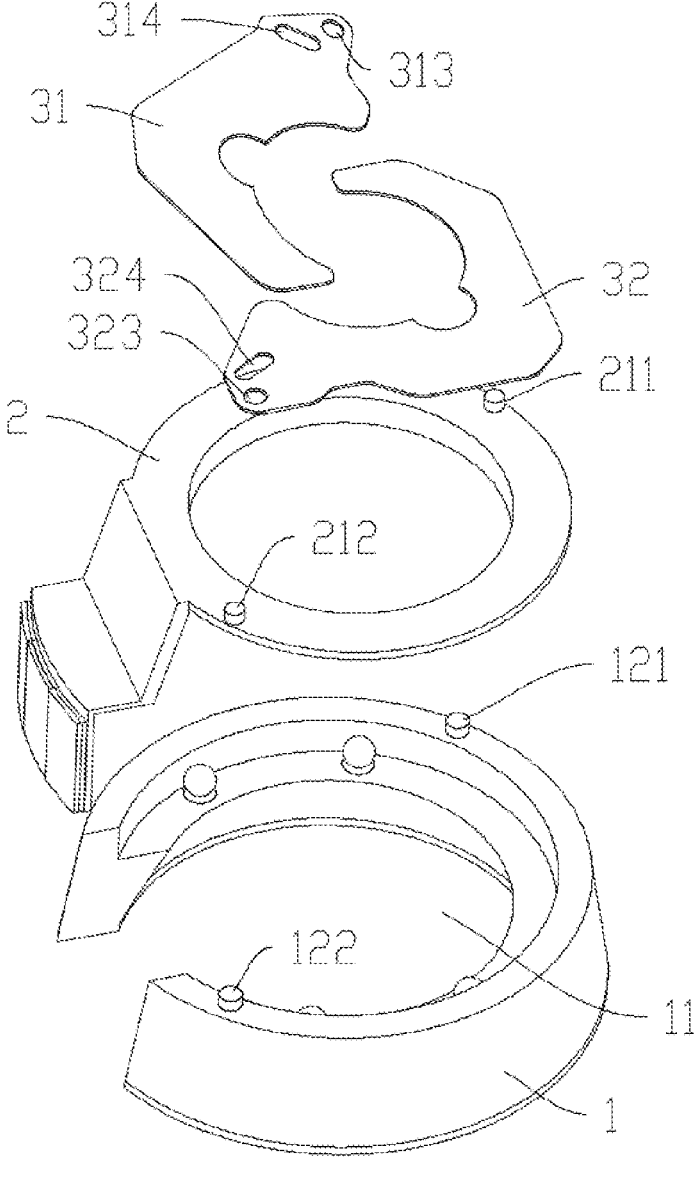
FIG. 7 is a schematic diagram of the structure of the variable aperture according to an embodiment of the present disclosure.

As shown in FIG. 7, in some embodiments, the first shading blade 31 is provided with a first blade hinge part 313 and a first blade guide part 314, while the second shading blade 32 is provided with a second blade hinge part 323 and a second blade guide part 324.

The base member on the circumference of the aperture hole 11 is provided with a first aperture hinge part 121 and a second aperture hinge part 122. The first aperture hinge part 121 and the second aperture hinge part 122 are spaced along the circumferential direction of the aperture hole 11; the driving member 2 is provided with a first aperture guide part 211 and a second aperture guide part 212; the first blade hinge part 313 is rotatably connected to the first aperture hinge part 121, the second blade hinge part 323 is rotatably connected to the second aperture hinge part 122, the first blade guide part 314 is movably connected to the first aperture guide part 211, and the second blade guide part 324 is movably connected to the second aperture guide part 212.

When the driving member 2 moves relative to the base member, the first aperture guide part 211 can drive the first shading blade 31 to rotate around the first aperture hinge part 121, and the second aperture guide part 212 can drive the second shading blade 32 to rotate around the second aperture hinge part 122, and the rotation directions of the first shading blade 31 and the second shading blade 32 are opposite.

Based on the concept of the present disclosure, the first shading blade 31 and the second shading blade 32 can also be arranged in a hinged manner with different positions. The two shading blades 3 are separately rotatably connected to the base member, and separately movably connected to the driving member 2, which can also achieve the adjustment of the aperture by the two shading blades 3.

As shown in FIGS. 3 and 4, in some embodiments, the driving member 2 includes a rotary joint 22 and an actuation joint 23; the rotary joint 22 has an annular structure, the rotary joint 22 is connected to the base member, and at least one shading blade 3 is movably connected to the rotary joint 22; the axes of the rotation connecting part 22 and the aperture hole 11 coincide, and the rotation connecting part 22 can rotate around the axis of the aperture hole 11 relative to the base member; the actuation joint 23 is connected to the rotary joint 22, and the actuation joint 23 is used to provide rotational torque for the rotary joint 22.

In order to solve the assembly position of the driving member 2, the driving member 2 is designed as two parts: the rotary joint 22 and the actuation joint 23. The rotary joint 22 is designed as an annular shape and arranged in a coaxial rotation with the aperture hole 11, so that the driving member 2 can rotatably move around the axis of the aperture hole 11, and the shading blade 3 is movably connected to the rotary joint 22, the self-motion of the driving member 2 and the stability of driving the shading blade 3 are greatly improved, it also has corresponding impact resistance, and the actuation joint 23 can connect to the driving structure to provide rotational torque for the rotary joint 22.

As shown in FIGS. 3 and 4, in some embodiments, the base member on the circumference of the aperture hole 11 is provided with an inward concave annular step 13, and the rotary joint 22 is located on the annular step 13. The assembly of the rotary joint 22 through the annular step 13 has the advantages of simple structure, high assembly connection reliability, and is also conducive to reducing the axial size of the variable aperture 10, which is beneficial for the application of the variable aperture 10 in micro and small camera modules.

As shown in FIGS. 3 and 4, in some embodiments, there are at least three first balls 14 between the annular step 13 and the rotary joint 22, and the at least three first balls 14 are used to achieve rotational motion between the rotary joint 22 and the first base member 1 through rolling friction.

Using at least three first balls 14 to improve the sliding friction between the rotary joint 22 and the annular step 13 to rolling friction is beneficial for reducing the frictional resistance between the rotary joint 22 and the annular step 13, improving the rotational performance of the driving member 2, and improving the adjustable performance of the variable aperture 10.

As shown in FIGS. 3 and 4, in some embodiments, the first base member 1 is further provided with an avoidance opening 15, which is communicated with the annular step 13, and the actuation joint 23 extends to the outer side of the first base member 1 through the avoidance opening 15; the size of the avoidance opening 15 is larger than the size of the actuation joint 23, so that the actuation joint 23 can rotate within the avoidance opening 15.

Through the avoidance opening 15 of the first base member 1, the actuation joint 23 can be extended to the outer side of the first base member 1 to obtain the power input of the driving device. This eliminates the need for the variable aperture 10 to be provided with a driving device within itself, or allows for the use of a driving device (such as a zoom actuator, an anti-shake actuator) of the adjacent structure, further simplifying the structure of the variable aperture 10.

As shown in FIGS. 3 and 4, in some embodiments, the variable aperture 10 also includes a first driving component 4, which includes a first magnet group 41 and a first coil group 42; the actuation joint 23 is connected to the first magnet group 41 or the first coil group 42, and the magnetic fields of the first magnet group 41 and the first coil group 42 are coupled.

By utilizing the first driving component 4, the magnetic field force can be used to drive the actuating connection portion 23 to rotate, the actuating connection portion 23 drives the rotating connection portion 22 to rotate, and the aperture guide part 21 of the rotating connection portion 22 cooperates with the blade guide part 302 of the shading blade 3 to drive the shading blade 3 to rotate around the aperture hinge part 12, thereby achieving aperture adjustment.

Illustratively, the first magnet group 41 is located on the actuation joint 23, and the first coil group 42 is located on other structure (such as the first base member 1, a camera module base, and other structures fixed relative to the driving member 2). Alternatively, the first coil group 42 is located on the actuating connection portion 23, and the first magnet group 41 is located on other structure.

As another example, the first magnet group 41 includes at least one magnet, and the first coil group 42 includes at least one energized coil.

Optionally, the first magnet group 41 includes at least two magnets arranged adjacent to each other along the rotation direction of the actuation joint 23. The magnetic field direction of the magnets is in the direction near and away from the axis of the aperture hole 11, and the magnetic field directions of the adjacent magnets are opposite. For example, the N pole of the first magnet faces the axis of the aperture hole 11, and the S pole faces away from the axis of the aperture hole 11; then the N pole of the adjacent second magnet faces away from the axis of the aperture hole 11, and the S pole faces towards the axis of the aperture hole 11.

When the first coil group 42 corresponding to the above two magnets is energized in a certain direction to generate a magnetic field with N pole facing the axis of the aperture hole 11, the first coil group 42 attracts the S pole of the first magnet and repels the N pole of the second magnet. As a result, the actuation joint 23 has a rotational trend to align the first coil group 42 with the first magnet.

It should be noted that the magnetic field coupling between the first magnet group 41 and the first coil group 42 can be understood as that the magnetic field generated by the first magnet group 41 coincides at least partially with the magnetic field generated by the first coil group 42, thereby generating attraction or repulsion between the two magnetic fields. The magnetic field generated by the first coil group 42 is affected by the current flowing in it, so that the mutual force between the two magnetic fields can be controlled. That is, by controlling the current of the first coil group 42, the magnetic field of the first coil group 42 can be changed, thereby adjusting the mutual force between the first magnet group 41 and the first coil group 42. When the position of one of the first magnet group 41 and the first coil group 42 is fixed, the other will be pulled or pushed by a reaction force, resulting in the desired movement effect.

Figure 8:
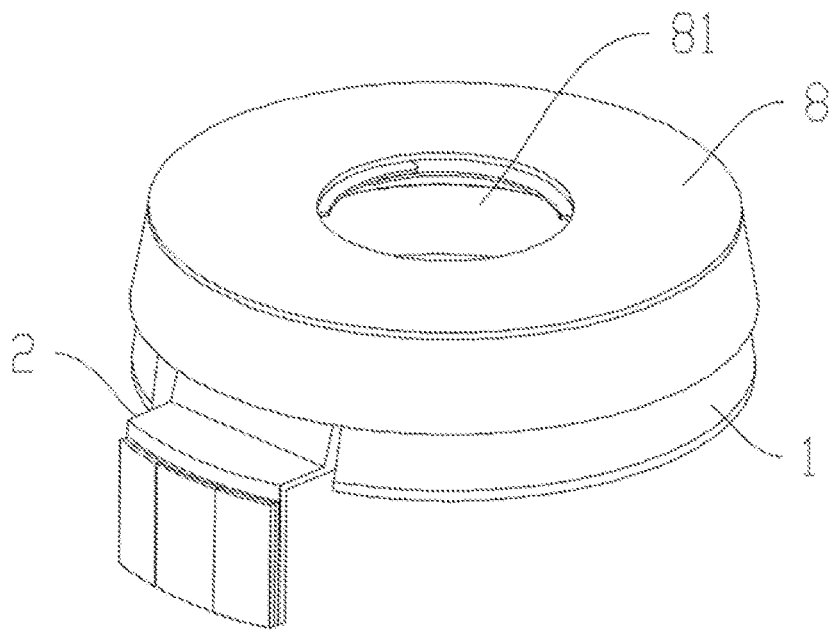
FIG. 8 is a schematic diagram of the structure of the variable aperture according to an embodiment of the present disclosure.
Figure 9:
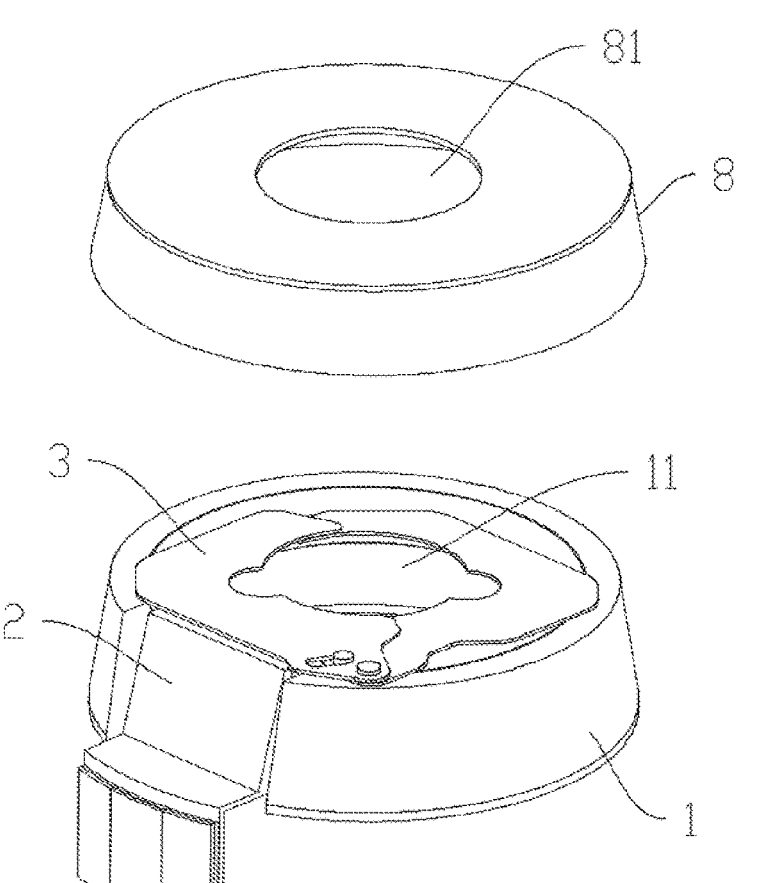
FIG. 9 is an exploded view of the structure of the variable aperture according to an embodiment of the present disclosure.

As shown in FIGS. 8 and 9, in some embodiments, the variable aperture 10 also includes a first housing 8, which is connected to the first base member 1 along the axial direction of the aperture hole 11. The driving member 2 and at least one shading blade 3 are located inside the first housing 8, and the first housing 8 is provided with an avoidance hole 81 for light to pass through. The first housing 8 can provide protection and dust prevention by keeping the shading blade 3 and the driving member 2 inside.

The beneficial effects brought by the technical solutions provided in the present disclosure at least include:

in the variable aperture of the present disclosure, the shading blade and the base member are rotatably connected, and the driving member drives the shading blade to rotate relative to the base member, causing at least a portion of the shading blade to rotate into or out of the aperture hole, changing the effective light entrance area of the aperture hole, and thus achieving the adjustment of the aperture size; the structure of the shading blade and the driving member is simple, and the adjustment of the aperture is achieved by rotation without the need for complex mechanical structures, and the volume is small, which is beneficial for the application of the variable aperture in the miniaturized and microminiaturized camera modules; in addition, compared to other movable connection manner, rotational connection has better impact resistance and can improve the working reliability of the variable aperture.

Figure 10:
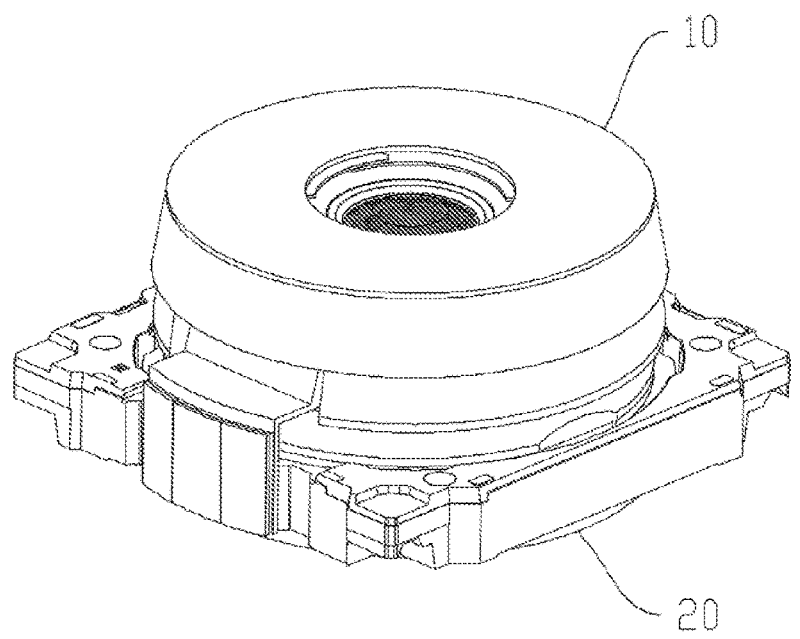
FIG. 10 is a structural schematic diagram of a camera module according to an embodiment of the present disclosure.
Figure 11:
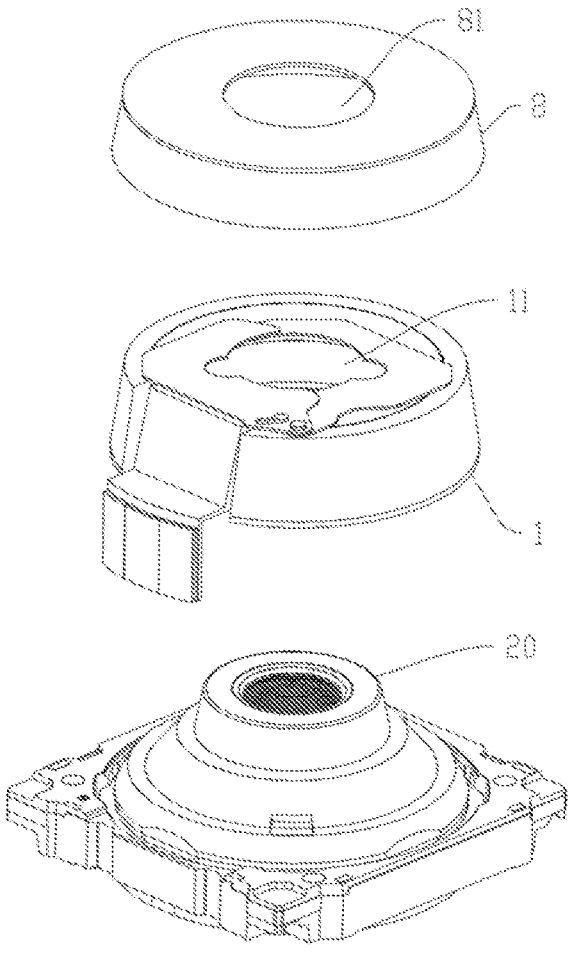
FIG. 11 is an exploded view of the structure of the camera module according to an embodiment of the present disclosure.

On the other hand, as shown in FIGS. 10 and 11, this embodiment provides a camera module, which includes: an optical lens 20; a photosensitive component, which includes a circuit board and a photosensitive element, the photosensitive element is electrically connected to the circuit board, and the optical lens 20 is located on a photosensitive path of the photosensitive element; and the variable aperture 10 of the present disclosure, where the variable aperture 10 is located on a light entrance path of the optical lens 20.

The camera module of this embodiment adopts the actuator of the present disclosure, and has all the beneficial technical effects of all embodiments in the present disclosure. The variable aperture 10 is located on the light entrance path of the optical lens 20, which can adjust the amount of light entering the optical lens 20, thereby achieving the aperture adjustment of the camera module.

In some possible implementations, a printed circuit is installed on the surface of the circuit board, and the circuit board includes a printed circuit board (PCB), a flexible printed circuit board (FPC), a rigid-flex PCB, and so on.

The camera module of this embodiment is used to capture images or videos.

In some possible implementations, the photosensitive element, also known as an image sensor, can be a complementary metal oxide semiconductor (CMOS) or charged coupled device (CCD). It can also be other types of image sensors other than CMOS or CCD, such as a Charge Injection Device (CID) sensor.

It can be understood that for CMOS, a Digital Signal Process (DSP) can be integrated within the CMOS. The CMOS has the advantages of high integration, low power consumption, and low cost, making it more suitable to be installed in the electronic devices with limited space, such as mobile phones.

In some possible implementations, the camera module may also include a flash. The flash can be a single color temperature flash or a dual color temperature flash. The dual color temperature flash refers to the combination of warm light flash and cold light flash, which can be used for light compensation under different color temperatures.

Illustratively, the camera module includes a front camera and a rear camera. Usually, the front camera is set on the front panel of the electronic device, and the rear camera is set on the back of the electronic device. In some embodiments, there are at least two rear cameras, which are any one of the main camera, the depth-of-field camera, the wide-angle camera and the telephoto camera, so as to realize the background blur function through the fusion of the main camera and the depth-of-field camera, and the panoramic shooting, the Virtual Reality (VR) shooting function or other fusion shooting functions through the fusion of the main camera and the wide-angle camera.

In the camera module provided in this embodiment, during the shooting process, the imaging light of the photographed object enters the optical lens 20 and then reaches the image sensor, and the photons in the imaging light strike the image sensor to generate movable charges, which is an internal photoelectric effect. The movable charges are gathered to form an electrical signal.

The above electrical signal is transmitted to the motherboard through the flexible circuit board, etc. The motherboard is provided with an analog-to-digital converter (A/D converter) and a digital signal process (DSP). The A/D converter converts the above electrical signal into a digital signal, and the digital signal is processed by the DSP and finally is transmitted to the screen of the electronic device to display an image, i.e., the shooting of the photographed object is achieved.

As shown in FIGS. 10 and 11, in some embodiments, the first base member 1 is connected to the optical lens 20, and the axis of the aperture hole 11 coincides with the optical center of the optical lens 20. By connecting the variable aperture 10 to the optical lens 20 with high precision and stability through the first base member 1, it is beneficial to ensure the accuracy of aperture adjustment.

Figure 13:
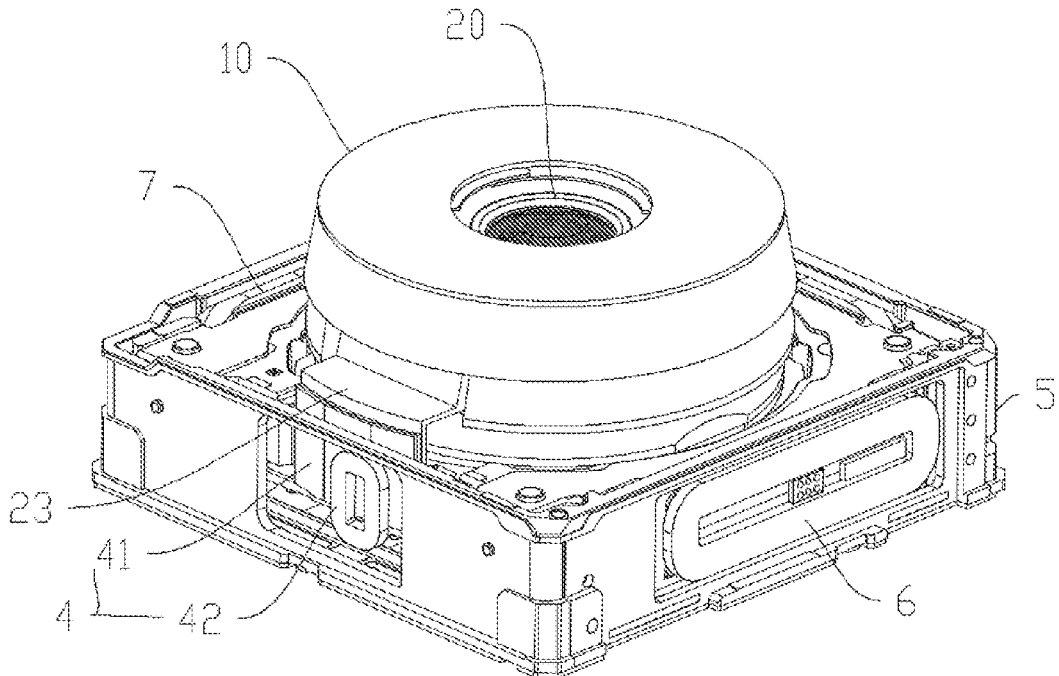
FIG. 13 is a schematic diagram of a state of removing the second housing of the camera module according to an embodiment of the present disclosure.

As shown in FIG. 13, in some embodiments, the camera module further includes a second base member 5, a zoom device 6, and an anti-shake device 7; the optical lens 20 is supported above the second base member 5 through the zoom device 6 and the anti-shake device 7, and the photo-sensitive component is located at the side where the second base member 5 is located.

The camera module of this embodiment can use the zoom device 6 to achieve automatic zoom along the Z axis (i.e. the axis direction of the aperture hole 11), and use the anti-shake device 7 to achieve optical anti-shake along the X and Y axes. The imaging quality of the camera module is high.

Figure 12:
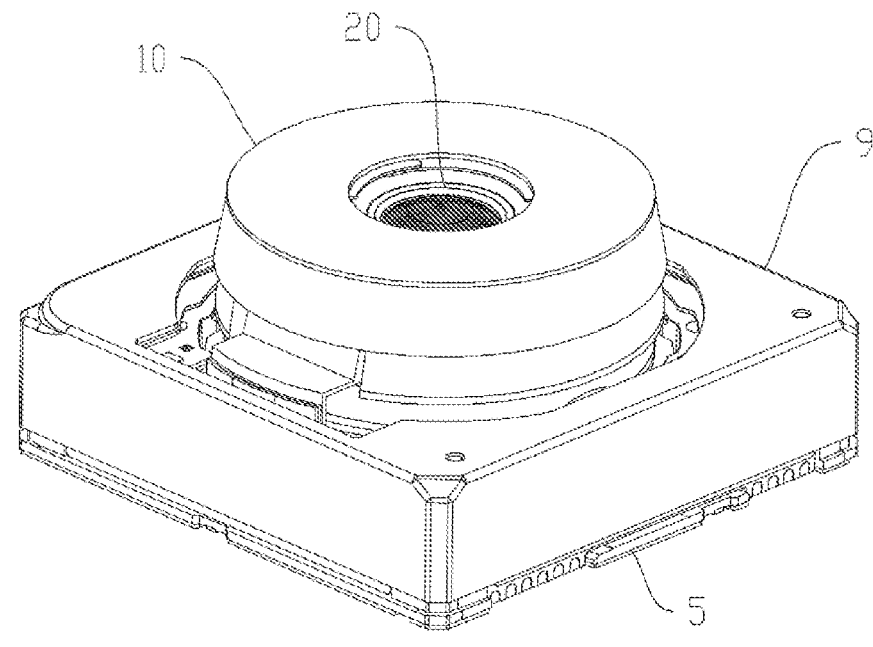
FIG. 12 is a structural schematic diagram of the camera module according to an embodiment of the present disclosure.

As shown in FIG. 12, in some embodiments, the driving member 2 includes a rotary joint 22 and an actuation joint 23; the variable aperture 10 also includes a first driving component 4, which includes a first magnet group 41 and a first coil group 42; the end of the actuating connection portion 23 extends to the second base member 5, one of the first magnet group 41 and the first coil group 42 is located on the second base member 5, and the other one of the first magnet group 41 and the first coil group 42 is located on the actuating connection portion 23.

The camera module of this embodiment can arrange the first magnet group 41 or the first coil group 42 of the first driving component 4 on the second base, fully utilizing the axial space of the camera module and reducing the structural complexity of the variable aperture 10.

Figure 14:
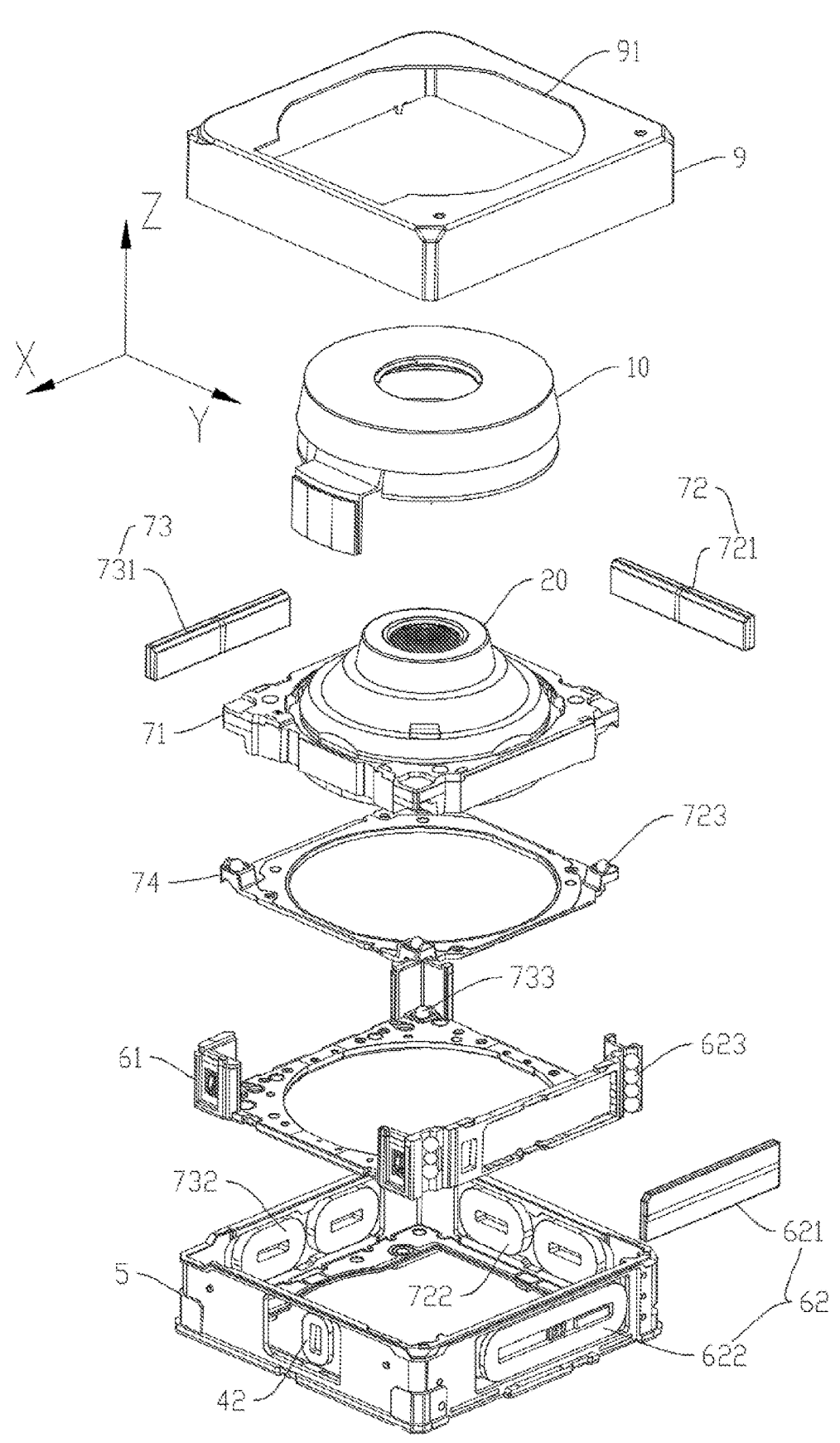
FIG. 14 is an exploded view of the structure of the camera module according to an embodiment of the present disclosure.

As shown in FIG. 14, in some embodiments, the zoom device 6 includes a first support member 61 and a second driving component 62; the optical lens 20 is located on the first support member 61, which is movably connected to the second base member 5. The first support member 61 can move along the axial direction of the optical lens 20; the second driving component 62 includes a second magnet group 621 and a second coil group 622 with magnetic field coupled, where the second magnet group 621 is located on one of the first support member 61 and the second base member 5, and the second coil group 622 is located on the other one of the first support member 61 and the second base member 5.

By utilizing the second driving component 62, it is possible to achieve zoom of the camera module and improve the imaging quality of the camera module.

For example, the second driving component 62 also includes a second ball 623, which is located between the first support member 61 and the second base member 5. The second ball 623 can achieve a linear zoom motion between the first support member 61 and the second base member 5 through rolling friction.

As another example, the second magnet group 621 is located on the first support member 61, and the second coil group 622 is located on the second base member 5; alternatively, the second magnet group 621 is located on the second base member 5, and the second coil group 622 is located on the first support member 61.

As shown in FIG. 14, in some embodiments, the anti-shake device 7 includes a second support member 71, a third driving component 72, and a fourth driving component 73; the optical lens 20 is located on the second support member 71, which is movably connected to the first support member 61. The second support member 71 can move in a direction perpendicular to the axis of the optical lens 20; the third driving component 72 includes a third magnet group 721 and a third coil group 722 with magnetic field coupled; the third magnet group 721 is located on one of the second support member 71 and the first support member 61, and the third coil group 722 is located on the other one of the second support member 71 and the first support member 61; alternatively, the third magnet group 721 is located on one of the second support member 71 and the second base member 5, and the third coil group 722 is located on the other one of the second support member 71 and the second base member 5; the fourth driving component 73 includes a fourth magnet group 731 and a fourth coil group 732 with magnetic field coupled; the fourth magnet group 731 is located on one of the second support member 71 and the first support member 61, and the fourth coil group 732 is located on the other one of the second support member 71 and the first support member 61; alternatively, the fourth magnet group 731 is located on one of the second support member 71 and the second base member 5, and the fourth coil group 732 is located on the other one of the second support member 71 and the second base member 5.

Among them, the third driving component 72 and the fourth driving component 73 are used for anti-freezing driving of the X-axis and Y-axis, respectively.

By utilizing the third driving component 72 and the fourth driving member 2, it is possible to achieve optical anti-shake of the camera module and improve the imaging quality of the camera module.

For example, the anti-shake device 7 also includes a third support member 74, which is located between the second support member 71 and the first support member 61. The first support member 61 and the third support member 74 have one of the X-axis and Y-axis degrees of freedom, and the third support member 74 and the second support member 71 have the other one of the X-axis and Y-axis degrees of freedom.

As another example, the third driving component 72 also includes a third ball 723, and the fourth driving component 73 also includes a fourth ball 733. The third ball 723 is located between the third support member 74 and the second support member 71 to achieve X-axis or Y-axis rolling friction, and the fourth ball 733 is located between the third support member 74 and the first support member 61 to achieve X-axis or Y-axis rolling friction.

As shown in FIGS. 13 and 14, in some embodiments, the camera module also includes a second housing 9, and the second housing 9 is connected with the second base member 5 along an axial direction of the optical lens 20. The housing is provided with a lens hole 91 for the optical lens 20 and/or the variable aperture 10 to pass through. The second housing 9 can be used to wrap the zoom device 6 and anti-shake device 7 of the camera module, providing protection and dust prevention functions.

On the other hand, the present embodiment provides an electronic device, which includes the variable aperture of the present disclosure or the camera module of the present disclosure.

The electronic device of this embodiment adopts the actuator or the camera module of the present disclosure, and has all the beneficial technical effects of all embodiments in the present disclosure.

In some possible implementations, the terminal device may also include a radio frequency (RF) circuit, a memory containing one or more computer-readable storage media, an input unit, a display unit, a sensor, an audio circuit, a Wi-Fi module, a processor containing one or more processing cores, a power supply, and other components.

The variable aperture 10 or camera module are respectively electrically connected to the processor. The processor is the control center of the terminal device, and various parts of the entire mobile phone are connected through various interfaces and lines. By running or executing software programs and/or modules stored in the memory, as well as calling data stored in the memory, various functions of the terminal device are executed and data is processed, thus monitoring the whole mobile phone. Optionally, the processor may include one or more processing cores; preferably, the processor can integrate an application processor and a modulation and demodulation processor, where the application processor mainly handles operating storage media, user interfaces, and application programs, while the modulation and demodulation processor mainly handles wireless communication. It can be understood that the modulation and demodulation processor mentioned above may not be integrated into the processor.

It should be pointed out that in the present disclosure, "several" and "at least one" refer to one or more, while "a plurality of" and "at least two" refer to two or more. "And/or" describes the association relationship of the associated objects, indicating that there can be three types of relationships, for example, A and/or B can represent: A exists alone, A and B exist simultaneously, and B exists alone. The character "/" generally indicates that the associated objects have an "or" relationship.

In the description of this application, it should be noted that unless otherwise specified and limited, the terms "installation", "link", and "connection" should be broadly understood, for example, they can be fixed connections, detachable connections, or integrated connections; they can be a mechanical connection; they can be a direct connection or an indirect connection through an intermediate medium, and can be the internal communication between two elements or the interaction relationship between two elements. For those skilled in the art, the specific meanings of the above terms in the present disclosure can be understood based on specific circumstances.

In addition, the terms "first" and "second" are only used to describe the purpose and cannot be understood as indicating or implying relative importance or implicitly indicating the number of indicated technical features. Therefore, the features defined as "first" and "second" can include one or more features explicitly or implicitly. In the description of the present disclosure, "a plurality of" means two or more, unless otherwise specifically defined.

In the present disclosure, unless otherwise explicitly specified and limited, the first feature "above" or "under" the second feature may include direct contact between the first and second features, or may include that the first and second features are not in direct contact but contact through another feature between them. Moreover, the first feature "above", "over" and "on" the second feature includes that the first feature is directly above and obliquely above the second feature, or only indicates that the horizontal height of the first feature is higher than that of the second feature. The first feature "under", "beneath" and "below" the second feature includes that the first feature is directly below and obliquely below the second feature, or only indicates that the horizontal height of the first feature is lower than that of the second feature.

In the description of the present specification, the description referring to the terms "certain implementation", "one implementation", "some implementations", "illustrative implementation", "example", "specific example" or "some examples" means that the specific features, structures, materials or characteristics described in connection with the implementations or examples are included in at least one implementation or example of the present disclosure.

The above are only embodiments of the present disclosure and are not intended to limit the present disclosure. Any modifications, equivalent replacements, improvements, etc. made within the principles of the present disclosure shall be included in the scope of protection of the present disclosure.

What is claimed is:

1. A variable aperture, comprising:
   a first base member, a driving member, and at least one shading blade;
   wherein the first base member comprises an aperture hole, the at least one shading blade is rotatably connected to the first base member, and the driving member is movably connected to the at least one shading blade; and
   wherein the variable aperture is configured that, in response to that the driving member moves relative to the first base member, the driving member drives the at least one shading blade to rotate relative to the first base member, thereby causing at least a portion of the at least one shading blade to enter or exit the aperture hole, thereby changing an effective light entrance area of the aperture hole,
   wherein the shading blade comprises a first shading blade and a second shading blade;
   wherein the first shading blade and the second shading blade are respectively rotatably connected to the first base member, and the first shading blade and the second shading blade are located at different positions on a circumference of the aperture hole;
   wherein the first shading blade and the second shading blade are respectively movably connected to the driving member, wherein the driving member drives the first shading blade and the second shading blade to rotate relative to the first base member respectively, thereby causing at least portions of the first shading blade and the second shading blade to synchronously enter or exit the aperture hole;
   wherein the first shading blade comprises a first concave part on a first side facing an axis of the aperture hole, and the second shading blade comprises a second concave part on a second side facing the axis of the aperture hole;
   wherein the first concave part and the second concave part are positioned in corresponding alignment, in response to that the first shading blade and the second shading blade synchronously enter the aperture hole, the first concave part and the second concave part are seamlessly connected, wherein a first space enclosed by the first concave part and the second concave part forms a first target aperture;
   wherein the first shading blade comprises a first blade hinge part and a first blade guide part, and the second shading blade comprises a second blade hinge part and a second blade guide part;
   the first base member comprises an aperture hinge part on the circumference of the aperture hole, and the driving member comprises an aperture guide part;
   wherein the first blade hinge part and the second blade hinge part are respectively rotatably connected to the aperture hinge part, and the first blade guide part and the second blade guide part are respectively movably connected to the aperture guide part;
   in response to that the driving member moves relative to the first base member, the aperture guide part drives the first shading blade and the second shading blade to respectively rotate in opposite directions around the aperture hinge part.

2. The variable aperture according to claim 1, wherein the variable aperture further comprises at least one of followings:
   the first blade hinge part and the second blade hinge part are hinge holes and the aperture hinge part is a hinge shaft; or one of the first blade hinge part and the second blade hinge part is a hinge shaft and the other one of the first blade hinge part and the second blade hinge part is a hinge hole, and the aperture hinge part is a hinge hole, wherein rotation axes of the first blade hinge part, the second blade hinge part and the aperture hinge part are parallel to an axis of the aperture hole, thereby causing the first shading blade and the second shading blade to rotate in a plane perpendicular to the axis of the aperture hole; or the first blade guide part and the second blade guide part are guide grooves and the aperture guide part is a guide protrusion; or the first blade guide part and the second blade guide part are guide protrusions and the aperture guide part is a guide groove.

3. The variable aperture according to claim 1, wherein the first shading blade further comprises a third concave party on an inner side of the first concave part, and the second shading blade further comprises a fourth concave part on an inner side of the second concave part;

wherein the third concave part and the fourth concave part are positioned in corresponding alignment, in response to that the first shading blade and the second shading blade synchronously enter the aperture hole, the third concave part and the fourth concave part are seamlessly connected, wherein a second space enclosed by the third concave part and the fourth concave part forms a first target aperture.

4. The variable aperture according to claim 1, wherein the driving member comprises a rotary joint and an actuation joint; wherein the rotary joint comprises an annular structure, wherein the rotary joint is connected to the first base member, and the at least one shading blade is movably connected to the rotary joint; an axis of the rotary joint coincides with an axis of the aperture hole, thereby causing the rotary joint to rotate around the axis of the aperture hole relative to the first base member;

the actuation joint is connected to the rotary joint, wherein the actuation joint is configured to provide a rotational torque to the rotary joint.

5. The variable aperture according to claim 4, wherein the first base member comprises an inward concave annular step on a circumference of the aperture hole, wherein the rotary joint is positioned on the annular step.

6. The variable aperture according to claim 5, further comprising:

at least three balls positioned between the annular step and the rotary joint, wherein the at least three balls are configured to facilitate rotational movement between the rotary joint and the first base member through a rolling friction mechanism.

7. The variable aperture according to claim 5, wherein the first base member further comprises an avoidance opening, wherein the avoidance opening is communicated with the annular step, and the actuation joint extends to an outer side of the first base member through the avoidance opening;

wherein a size of the avoidance opening is larger than a size of the actuation joint, thereby causing the actuation joint to rotate within the avoidance opening.

8. The variable aperture according to claim 4, wherein variable aperture further comprises a first driving component, wherein the first driving component comprises a first magnet group and a first coil group;

wherein the actuation joint is connected to the first magnet group or the first coil group, and magnetic fields of the first magnet group and the first coil group are magnetically interconnected.

9. The variable aperture according to claim 1, wherein the variable aperture further comprises a housing comprising an avoidance hole for light to pass though, wherein the housing and the first base member are axially connected along the aperture hole, the driving member and the at least one shading blade are positioned within the housing.

10. A camera module, comprising:

an optical lens;

a photosensitive component comprising a circuit board and a photosensitive element, wherein the photosensitive element is electrically connected to the circuit board, and the optical lens is positioned on a photosensitive path of the photosensitive element; and a variable aperture positioned on a light entrance path of the optical lens, comprising: a first base member, a driving member, and at least one shading blade;

wherein the first base member comprises an aperture hole, the at least one shading blade is rotatably connected to the first base member, and the driving member is movably connected to the at least one shading blade; and wherein the variable aperture is configured that, in response to that the driving member moves relative to the first base member, the driving member drives the at least one shading blade to rotate relative to the first base member, thereby causing at least a portion of the at least one shading blade to enter or exit the aperture hole, thereby changing an effective light entrance area of the aperture hole, wherein the shading blade comprises a first shading blade and a second shading blade;

wherein the first shading blade and the second shading blade are respectively rotatably connected to the first base member, and the first shading blade and the second shading blade are located at different positions on a circumference of the aperture hole;

wherein the first shading blade and the second shading blade are respectively movably connected to the driving member, wherein the driving member drives the first shading blade and the second shading blade to rotate relative to the first base member respectively, thereby causing at least portions of the first shading blade and the second shading blade to synchronously enter or exit the aperture hole;

wherein the first shading blade comprises a first concave part on a first side facing an axis of the aperture hole, and the second shading blade comprises a second concave part on a second side facing the axis of the aperture hole;

wherein the first concave part and the second concave part are positioned in corresponding alignment, in response to that the first shading blade and the second shading blade synchronously enter the aperture hole, the first concave part and the second concave part are seamlessly connected, wherein a first space enclosed by the first concave part and the second concave part forms a first target aperture;

wherein the first shading blade comprises a first blade hinge part and a first blade guide part, and the second shading blade comprises a second blade hinge part and a second blade guide part;

the first base member comprises an aperture hinge part on the circumference of the aperture hole, and the driving member comprises an aperture guide part;

wherein the first blade hinge part and the second blade hinge part are respectively rotatably connected to the aperture hinge part, and the first blade guide part and the second blade guide part are respectively movably connected to the aperture guide part;

in response to that the driving member moves relative to the first base member, the aperture guide part drives the first shading blade and the second shading blade to respectively rotate in opposite directions around the aperture hinge part.

11. The camera module according to claim 10, wherein the camera module further comprises: a second base member, a zoom device, and an anti-shake device;

wherein the optical lens is supported on the second base member through the zoom device and the anti-shake device.

12. The camera module according to claim 11, wherein the driving member comprises a rotary joint and an actuation joint; the variable aperture further comprises a first driving component, and the first driving component comprises a first magnet group and a first coil group;

wherein an end of the actuation joint extends to the second base member, one of the first magnet group and the first coil group is positioned on the second base member, and the other one of the first magnet group and the first coil group is positioned on the actuation joint.

13. The camera module according to claim 11, wherein the zoom device comprises a first support member and a second driving component;

wherein the optical lens is positioned on the first support member, the first support member is movably connected to the second base member, thereby causing the first support member to move along an axial direction of the optical lens;

wherein the second driving component comprises a second magnet group and a second coil group with magnetic fields magnetically interconnected, wherein the second magnet group is positioned on one of the first support member and the second base member, and the second coil group is positioned on the other one of the first support member and the second base member.

14. The camera module according to claim 13, wherein the anti-shake device comprises a second support member, a third driving component, and a fourth driving component;

wherein the optical lens is positioned on the second support member, the second support member is movably connected to the first support member, and the second support member moves in a direction perpendicular to an axis of the optical lens;

wherein the third driving component comprises a third magnet group and a third coil group with magnetic fields magnetically interconnected;

wherein the third magnet group is positioned on one of the second support member and the first support member, and the third coil group is positioned on the other one of the second support member and the first support member; or, the third magnet group is positioned on one of the second support member and the second base member, and the third coil group is positioned on the other one of the second support member and the second base member;

wherein the fourth driving component comprises a fourth magnet group and a fourth coil group with magnetic fields magnetically interconnected;

wherein the fourth magnet group is positioned on one of the second support member and the first support member, and the fourth coil group is positioned on the other one of the second support member and the first support member; or, the fourth magnet group is positioned on one of the second support member and the second base member, and the fourth coil group is positioned on the other one of the second support member and the second base member.

15. An electronic device, comprising a variable aperture, wherein the variable aperture comprises: a first base member, a driving member, and at least one shading blade;

wherein the first base member comprises an aperture hole, the at least one shading blade is rotatably connected to the first base member, and the driving member is movably connected to the at least one shading blade; and wherein the variable aperture is configured that, in response to that the driving member moves relative to the first base member, the driving member drives the at least one shading blade to rotate relative to the first base member, thereby causing at least a portion of the at least one shading blade to enter or exit the aperture hole, thereby changing an effective light entrance area of the aperture hole, wherein the shading blade comprises a first shading blade and a second shading blade;

wherein the first shading blade and the second shading blade are respectively rotatably connected to the first base member, and the first shading blade and the second shading blade are located at different positions on a circumference of the aperture hole;

wherein the first shading blade and the second shading blade are respectively movably connected to the driving member, wherein the driving member drives the first shading blade and the second shading blade to rotate relative to the first base member respectively, thereby causing at least portions of the first shading blade and the second shading blade to synchronously enter or exit the aperture hole;

wherein the first shading blade comprises a first concave part on a first side facing an axis of the aperture hole, and the second shading blade comprises a second concave part on a second side facing the axis of the aperture hole;

wherein the first concave part and the second concave part are positioned in corresponding alignment, in response to that the first shading blade and the second shading blade synchronously enter the aperture hole, the first concave part and the second concave part are seamlessly connected, wherein a first space enclosed by the first concave part and the second concave part forms a first target aperture;

wherein the first shading blade comprises a first blade hinge part and a first blade guide part, and the second shading blade comprises a second blade hinge part and a second blade guide part;

the first base member comprises an aperture hinge part on the circumference of the aperture hole, and the driving member comprises an aperture guide part;

wherein the first blade hinge part and the second blade hinge part are respectively rotatably connected to the aperture hinge part, and the first blade guide part and the second blade guide part are respectively movably connected to the aperture guide part;

in response to that the driving member moves relative to the first base member, the aperture guide part drives the first shading blade and the second shading blade to respectively rotate in opposite directions around the aperture hinge part.

\* \* \* \* \*